Jan. 8, 1935.  G. EMERSON  1,987,394
PROTECTOR FOR TREES
Filed July 26, 1934
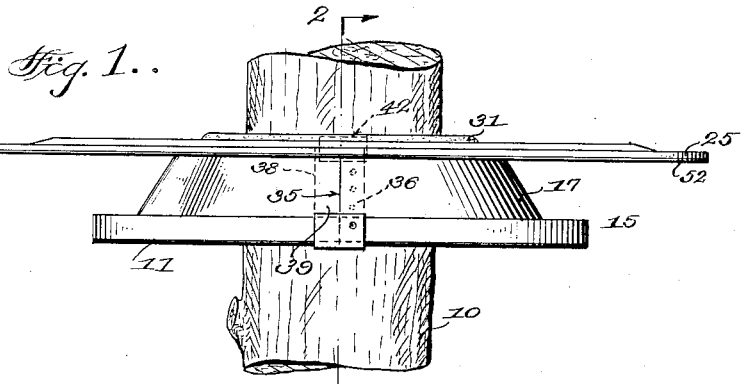
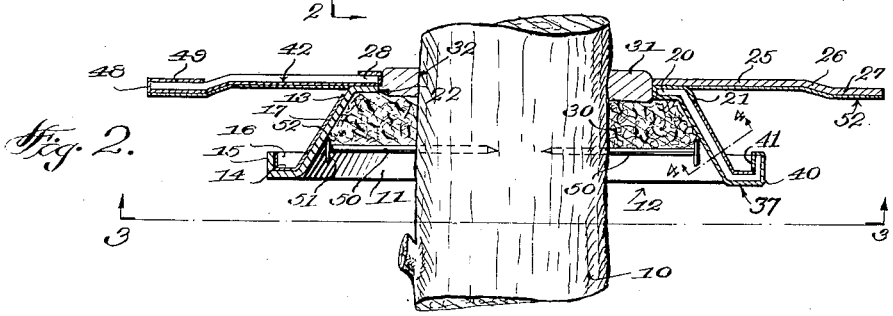
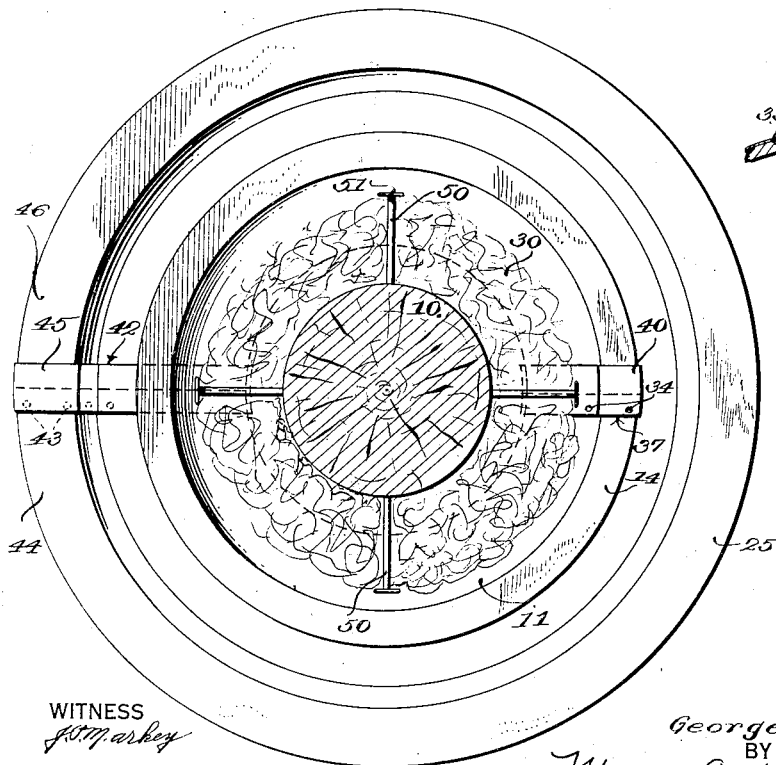
WITNESS
J. T. Markey
INVENTOR
George Emerson
BY
Munn, Anderson & Liddy
ATTORNEYS Patented Jan. 8, 1935

1,987,394

UNITED STATES PATENT OFFICE 1,987,394

PROTECTOR FOR TREES

George Emerson, Santa Barbara, Calif.

Application July 26, 1934, Serial No. 737,106

3 Claims. (Cl. 47—24)

This invention relates to a device for protecting trees and plants from the ravages of ants or other insects.

It has been proposed to apply various devices to trees having a packing of various materials such as cotton to prevent the passage of the insects to the upper portion of the tree or to the plant. These packings, however, being exposed to the elements will be compacted by moisture so that the ants or other insects can find their way around the compacted packing and such devices are impractical. It has also been proposed to employ a packing of dirt around the trees in connection with containers of various kinds but such packing does not prevent the ants or other insects from boring through the earth while too great a thickness of the earth tends to cause damage to the trees or plants.

An object of the present invention is the provision of a pair of nested circular members having circular openings spaced from the trunk of a tree or the stem of a plant with a cotton packing located in the space between the peripheries of the openings and the stem or trunk, a waterproof material being applied to the top of the packing and forming a seal between the nested members and the trunk to prevent the seepage of moisture into the packing.

Another object of the invention is the provision of a plurality of split circular members adapted to embrace the stem of a plant or the trunk of a tree with one of the members being of greater diameter than the other member and providing a protective covering to shield the other member from the elements, each of said members being provided with a central opening with the periphery of the opening spaced from the trunk of the tree, a cotton packing being located in the space to prevent the passage of insects between the circular members and the tree trunk, a waterproof material being applied to the top of the packing, to the cover member and the trunk of the tree for sealing the packing against the admission of moisture so that the packing will remain intact and provide an obstacle to the passage of insects.

This invention will be best understood from a consideration of the following detailed description, in view of the accompanying drawing forming a part of the specification; nevertheless, it is to be understood that the invention is not confined to the disclosure, being susceptible of such changes and modifications as define no material departure from the salient features of the invention as expressed in the appended claims.

In the drawing:

Figure 1 is a side view in elevation of a protective device constructed in accordance with the principles of my invention, Figure 2 is a vertical section of the device shown applied to a tree trunk and taken along the line 2—2 of Fig. 1, Figure 3 is a horizontal section taken along the line 3—3 of Figure 2 and looking in the direction of the arrows, and Figure 4 is a fragmentary transverse section taken along the line 4—4 of Figure 2.

Referring more particularly to the drawing, 10 designates a trunk of a tree to which the device may be applied but it will be appreciated that this device as the description will disclose may be applied in other positions and in connection with other types of plants to prevent the passage of ants or other insects from the ground to the upper portions of the tree or plant.

A cup-shaped member 11 is adapted to embrace the tree trunk and is in the shape of a truncated cone with the lower end 12 of greater diameter than the upper portion 13 which is spaced from the trunk of the tree.

The lower edge of the member 11 is provided with a lateral flange 14 and an upturned annular flange 15 to provide an annular channel or trough 16 to receive oil or other fluid which will prevent ants or other insects from passing from the inner surface of the member 11 to the outer inclined surface 17.

The upper end 13 of the cup-shaped member 11 has an inturned lateral annular flange 20 forming a shoulder for a purpose which will be presently described. The inner periphery of the annular flange 20 is spaced from the surface of the trunk 10 to provide an annular opening 22 which surrounds the trunk 10 in spaced relation.

A cover plate, generally designated by the numeral 25, is of greater diameter than the greatest diameter of the cup-shaped member 11 so that the plate extends beyond the confines of the member 11 and forms a protective member to prevent snow or rain from falling upon the member 11 so that when a liquid is employed in the annular channel 16 the plate 25 will prevent moisture from entering the channel and thereby affecting the utility of the liquid placed in the channel. It will be appreciated, however, that in certain instances it may not be necessary to employ the liquid impediment in the channel.

The plate 25 has a depressed portion 26 which places the annular outer portion 27 below the horizontal plane passing through the main body of the cover plate 25. The plate may have a flat surface or it may be bowed downwardly slightly in order to shed water.

The central portion of the plate 25 is provided with an opening so that the periphery of said opening will be spaced from the trunk of the tree. The inner portion 28 of the plate 25 adjacent said opening rests upon the flange 20.

A cotton packing 30 is packed into the space within the cup-shaped member 11 and against the surface of the trunk 10. This cotton packing will prevent the passage of ants or other insects from points below the member 11 to points above the same.

A waterproof material 31 formed of asphalt paste, wax, or other suitable composition material is applied to the upper surface of the cotton packing 30 with its outer periphery sealed to the peripheries of the openings in the plate 25 and the flange 20, while the inner periphery 32 is sealed to the outer surface of the trunk 10 in such a way that the waterproof material will prevent seepage of moisture into the packing 30. The waterproof material 30 as has been stated may be formed of any suitable material which will prevent the passage of water to the packing 30 and which will not be affected by temperatures in those regions where the protecting is employed.

The member 11 while being annular is split along the line indicated at 35 in Fig. 1 so that the device may be expanded for placing the member 11 around the tree trunk. One end 36 of the split member 11 has secured thereto in any approved manner a metal strip 37. The other edge 38 of the metal strip overlaps the other end 39 of the member 11 when said member is in position around the tree. Any kind of sealing fluid may be employed as stated above for closing the split portion which is embraced by the metal member or strap 37. The metal member 39 is secured to one end of the split member 11 by means of solder or spot welding as shown at 34.

The strap or metal member 37 is located within the member 11 and is bent around the flange 20 and against the outer surface of the cup-shaped member, as shown at 21, to neatly fit the same. The lower end of the strap is bent around the walls of the channel member 16, as shown at 40, and then is inturned as shown at 41 upon the inner face of the upturned flange 15.

A metal strap 42 is soldered or spot welded, as shown at 43, to one end 44 of the split cover plate 25. The other free edge 45 of the strap 42 overlaps the other free end 46 of the split cover plate 25. The sealing material, as explained above, may be employed for filling the space between the adjacent ends of the split member 25 to prevent the seepage of moisture therethrough.

It will be noted that the strap 42 is located at the underface of the plate 25 and follows the contour of the same. The outer end of the strap is bent around the free edge of the plate 25, as shown at 48, with the extreme free end of the strap being in flat contact with the upper surface of the plate 25, as shown at 49.

By the above described construction it is apparent that the cotton packing 30 will be placed in snug relation with the bark of the tree and with the nested portions of the members 11 and 25 while the waterproof material 31 will seal the cotton packing against moisture and thus retain the packing in proper condition to prevent the transition of insects from the lower portion of the tree to the upper portions.

The device is held in place on the trunk by means of nails 50 which are driven into the tree radially at spaced points so that the heads 51 will engage the inner surface of the cup-shaped member 11 in a plane passing through the bottom surface of the packing 30 with the packing resting upon said nails.

The outer surface of the cup-shaped member 11 and the undersurface of the cover 25 are treated with a heavy oil (shown at 52) that will not run as an additional deterrent to the travel of insects or other vermin. If desired, the entire surfaces of the cover and cup-shaped member may be so treated.

While I have shown the device applied to the trunk of a tree, this obstruction for the travel of insects may be employed in other relations.

I claim:—

1. A protector for trees comprising an inverted cup-shaped member having the upper end reduced and provided with a shoulder at said end, a cover plate adapted to project beyond and in protective relation with the cup-shaped member, the plate and member having centrally disposed openings to receive a tree trunk with the peripheries of the openings spaced from said trunk, a cotton packing within the cup-shaped member and embracing the trunk, a waterproof material on the packing and sealing the packing against the admission of moisture, said plate and cup-shaped member being split along a radius to provide an opening for placing said member and plate around a tree, a strip of material each secured along an edge to one end of the split cup-shaped member and the plate, the other edge of the strip overlapping the respective other end of the cup-shaped member and the plate.

2. A tree protector comprising a pair of split circular members, each member having a central opening adapted to be received by a tree trunk, the diameters of the openings being greater than the diameter of the trunk to provide an annular space between the trunk and the peripheries of the openings, a cotton packing in one of the circular members and waterproof material covering the packing and sealing the other of the members, the packing and the surface of the trunk adjacent the openings against the passage of moisture.

3. A tree protector comprising a pair of split circular members, each member having a central opening adapted to be received by a tree trunk, the diameters of the openings being greater than the diameter of the trung to provide an annular space between the trunk and the peripheries of openings, a cotton packing in one of the members and waterproof material covering the packing and sealing the other of the members, the packing and the surface of the trunk adjacent the openings against the passage of moisture, one of the members having a greater diameter than the other member providing a covering for said other member and supported by said other member.

GEORGE EMERSON.